US012791876B2

(12) United States Patent
Maffei et al.

(10) Patent No.: US 12,791,876 B2
(45) Date of Patent: Nov. 10, 2026

(54) METHOD AND LENS HOLDER FOR TINTING A SPECTACLE LENS

(71) Applicant: Carl Zeiss Vision International GmbH, Aalen (DE)

(72) Inventors: Mathias Maffei, Sant'Angelo in Vado (IT); Sara Bertoncello, Bisuschio (IT); Giada Giglioli, Gavirate (IT); Alberto Ferrari, Milan (IT); Marco Macchi, Tradate (IT); Michael Krieger, Aalen (DE); Philipp Weis, Neresheim (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/360,595

(22) Filed: Jul. 27, 2023

(65) Prior Publication Data

US 2023/0384620 A1 Nov. 30, 2023

Related U.S. Application Data

(63) Continuation of application No. PCT/EP2023/055050, filed on Feb. 28, 2023.

(30) Foreign Application Priority Data

Mar. 2, 2022 (EP) .................................... 22159782

(51) Int. Cl.
*G02C 7/10* (2006.01)

(52) U.S. Cl.
CPC ..................................... *G02C 7/10* (2013.01)

(58) Field of Classification Search
CPC ........................................................ G02C 7/10
See application file for complete search history.

(56) References Cited

U.S. PATENT DOCUMENTS

| | | | |
|---|---|---|---|
| 4,559,897 | A | 12/1985 | Urrea et al. |
| 4,991,849 | A | 2/1991 | Fabanich |
| 5,177,510 | A | 1/1993 | Peters |
| 5,453,100 | A | 9/1995 | Sieloff |
| 5,874,127 | A | 2/1999 | Winterton et al. |

(Continued)

FOREIGN PATENT DOCUMENTS

| | | | |
|---|---|---|---|
| CN | 1149085 | A | 5/1997 |
| CN | 102844699 | A | 12/2012 |

(Continued)

OTHER PUBLICATIONS

Industrial Norm "Ophthalmic optics—Spectacle lenses—Vocabulary (ISO 13666:2019)," English version EN ISO ISO 13666:2019, Dec. 2019.

(Continued)

*Primary Examiner* — James M Mellott
(74) *Attorney, Agent, or Firm* — Qubit IP, PLLC

(57) ABSTRACT

A method for tinting a spectacle lens includes selectively performing a surface treatment onto a preselected part of a surface of a spectacle lens and providing a tinting solution to the spectacle lens. Further, a lens holder for tinting a spectacle lens is provided, which comprises a reception unit suitable for holding the spectacle lens in a predefined position and a masking unit suitable for masking a part of a surface of the spectacle lens when held by the reception unit in a predefined position.

7 Claims, 6 Drawing Sheets

(56) References Cited

U.S. PATENT DOCUMENTS

| | | | | |
|---|---|---|---|---|
| 6,436,481 | B1 | 8/2002 | Chabrecek et al. | |
| 6,656,373 | B1 * | 12/2003 | Neal | G02B 3/0012 216/24 |
| 9,677,222 | B2 | 6/2017 | Archambeau et al. | |
| 2007/0294841 | A1 | 12/2007 | Thullen | |
| 2012/0207968 | A1 * | 8/2012 | Archambeau | D06P 5/00 359/613 |
| 2013/0008374 | A1 | 1/2013 | Ookubo et al. | |
| 2014/0134848 | A1 * | 5/2014 | Hisamatsu | H01L 21/31138 438/725 |
| 2019/0310492 | A1 | 10/2019 | Gromotka | |
| 2019/0358919 | A1 * | 11/2019 | Kumar | B29D 11/00644 |

FOREIGN PATENT DOCUMENTS

| | | | |
|---|---|---|---|
| CN | 105204180 | | 12/2015 |
| CN | 215004204 | U | 12/2021 |
| EP | 472303 | A2 | 2/1992 |
| EP | 1263612 | B1 | 5/2012 |
| EP | 3266598 | A1 | 1/2018 |
| EP | 1263612 | A1 | 12/2020 |
| EP | 2966484 | B1 | 10/2021 |
| JP | 3075403 | B1 | 8/2000 |
| JP | 2010224504 | A * | 10/2010 |
| JP | 2013073108 | A | 4/2013 |
| KR | 200400687 | Y1 | 11/2005 |
| WO | 2006/079564 | A1 | 8/2006 |

OTHER PUBLICATIONS

Poncin-Epaillard, "Illustration of surface crosslinking of different polymers treated in argon plasma," Macromol. Chem. Phys. 198(8), pp. 2439 to 2456, 1997.

Zhou et al., "Investigation of surface properties of plasma-modified polyamide 6 and polyamide 6/layered silicate nanocomposites," J Mater Sci 46: pp. 3084 to 3093, 2011.

"Übersicht der aktuellen 3D-Druckverfahren [overview of current 3D printing methods]", available at 3Druck.com—The Independent AM Magazine, available at 3druck.com/grundkurs-3d-drucker/teil-2-uebersicht-der-aktuellen-3d-druckverfahren-462146/, date published Apr. 15, 2015, last accessed Feb. 15, 2022, and English-language machine translation thereof.

Wikipedia entry "Multi Jet Modeling", available at de.wikipedia.org/wiki/Multi_Jet_Modeling, date published Jun. 7, 2021, last date accessed Feb. 15, 2022 and English-language machine translation thereof.

"Multi Jet Fusion (MJF): 3D Printing Technology", available at https://www.materialise.com/en/manufacturing/3d-printing-technology/multi-jet-fusion, last date accessed Feb. 15, 2022.

Wikipedia entry "Stereolithography" available at https://en.wikipedia.org/wiki/Stereolithography, last date accessed Feb. 15, 2022.

Wikipedia entry "Selective Laser Sintering" available at https://en.wikipedia.org/wiki/Selective_laser_sintering, last date accessed Feb. 15, 2022.

Wikipedia entry "Selective Laser Melting" available at https://en.wikipedia.org/wiki/Selective_laser_melting, last date accessed Feb. 15, 2022.

Wikipedia entry "Fused Deposition Modeling [Fused filament fabrication]" available at https://de.wikipedia.org/wiki/Fused_Deposition_Modeling, last date accessed Feb. 15, 2022, and English-language counterpart internet page thereof.

International Search Report and Written Opinion issued in PCT/EP2023/055050, to which this application claims priority, mailed May 3, 2023.

"PolyJet," available at https://www.materialise.com/en/industrial/3d-printing-technologies/polyjet, last date accessed Apr. 16, 2024.

"PolyJet Technology," available at https://www.stratasys.com/en/guide-to-3d-printing/technologies-and-materials/polyjet-technology/, last date accessed Apr. 16, 2024.

European Search Report issued in EP 22 159 782.6, to which this application claims priority, mailed Sep. 7, 2022.

Office Action by the Chinese Patent Office (SIPO) issued in CN 202380010125.X, which is a counterpart hereof, mailed on Jan. 2, 2024, and English translation thereof.

Office Action by the Korean Patent Office (KIPO) issued in KR 10-2023-7031286, which is a counterpart hereof, mailed on Feb. 3, 2024, and English translation thereof.

Office Action by the Japanese Patent Office (JPO) issued in JP 2023-544753, which is a counterpart hereof, mailed on Mar. 5, 2024, and English translation thereof.

Office Action by the Chinese Patent Office (CIPO) issued in CN 202380010125.X, which is a counterpart hereof, mailed on Jun. 22, 2024, and English-language translation thereof.

Office Action by the Japanese Patent Office (JPO) issued in JP 2023-544753, which is a counterpart hereof, mailed on Jun. 25, 2024, and English-language translation thereof.

Office Action by the Chinese Patent Office (CIPO) issued in CN 202380010125.X, which is a counterpart hereof, mailed on Oct. 31, 2024, and English-language translation thereof.

* cited by examiner

METHOD AND LENS HOLDER FOR TINTING A SPECTACLE LENS

CROSS REFERENCE TO RELATED APPLICATIONS

This application is a continuation application of International patent application PCT/EP2023/055050, filed on Feb. 28, 2023 and designating the U.S., which claims priority to European patent application EP 22 159 782.6, filed on Mar. 2, 2022, both of which are hereby incorporated by reference in their entireties.

TECHNICAL FIELD

The present disclosure relates to the tinting of a spectacle lens. In particular, the present disclosure relates to a method for tinting a spectacle lens by selectively treating a surface of the spectacle lens, a tinted spectacle lens obtained therefrom, and a lens holder used for the method thereof. Besides, the present disclosure is also directed to a tinting system comprising the lens holder, a corresponding computer program and computer-readable data and a kit for carrying out the method.

BACKGROUND

Tints for spectacle lenses are required for many reasons including medical and safety reasons. Due to the nature of the surfaces, caused either by the surface material itself or coatings applied on the surface, a simple surface printing does oftentimes not yield a tinting with the required quality, especially desired resolution and durability.

Further, there has been a need to effectively tint only a selected part of a surface of a spectacle lens such as patterns representing a mark, a number, a letter, a simple shape, etc. For sunglasses, solid tinted lenses are most commonly used, however, in recent years partial tints or gradient tints have become more and more important, providing added advantages.

Conventionally, selectively tinting spectacle lenses has up to now been achieved by designing and applying masking means such as adhesive tape or thin films to cover a part of a lens surface not desired to be tinted by immersing the lens in a bath comprising a dye. However, this method exhibits disadvantages with regard to reproducibility and homogeneity.

To be specific, the conventional method using an adhesive tape has drawbacks of infiltration of undesired materials beneath the masked part of the lens during the immersion of a lens into a tinting bath, especially when tinting on the curved surface of the spectacle lens (both concave and convex sides). As the tape is manually applied to the lenses, this poor applicability of the conventional method on the curved surfaces of the spectacle lens may be due to wrinkles formed when applying the tape onto the surface. Further, the wrinkles can be easily formed on the edges of the tapes as the tape, of which the shape is mostly flat, has to be applied onto the curved surfaces of the spectacle lens. Moreover, the larger the portion of the spectacle lens needs to be masked, the poorer the adhesion between the tape and the spectacle lens gets. These wrinkles cause water infiltration and thus lead to inhomogeneous tinting with blurred edges of the pattern, or eventually color stains. Particularly, with spectacle lenses having high curvatures, it was difficult to obtain a desired tinting with a good quality using the conventional method.

Further, the conventional selective tinting method was only able to provide limited tinting patterns. For example, the method most commonly used for realizing a tinting pattern is a die-cutting process whereby a die is used to cut through an adhesive tape on a die press to prepare the tape into a desired form. However, the die-cutting process does not allow the realization of patterns with a small size or complicated patterns because there the small-sized tape could easily break during the die-cutting or tape applying step. In addition, small size of masking tapes may be prone to tinting infiltrations as well. Moreover, as a step of applying the die-cut tape to a spectacle lens is manually done, a tape with a shape which is not connected to a lens edge (side) is difficult to be realized as aligning the tape to a plurality of lenses on the exact same position cannot be easily repeated with precision by using hands. As such, the conventional method is inefficient and even not suitable for tinting selective, complex, and/or small patterns on spectacle lenses. U.S. Pat. No. 4,991,849 directed to incorporating a slit into golf glasses mentions masking the slit portion during the shading of the golf glasses, but this also involves the same problem addressed above. Moreover, it fails to provide any specific masking method.

Lastly, tape tinting in most cases requires first of all a preparation of a metal die for the die realization of the individual tapes to be applied onto the respective spectacle lenses, and afterwards the tapes to be die-cut. Also, as the tapes are required as many as the number of the spectacle lenses to be tinted, this is a tedious process and involves a high level of manual labor and skillfulness of the operators aligning the tape to the lenses. Further, the adhesive tapes have to be disposed after use. Moreover, even when producing a single or only few prototypes of a tinted lens at the initial stage of lens development, a metal die needs to be already manufactured with an associated cost and time.

To improve the tinting of ophthalmic lenses, U.S. Pat. No. 9,677,222 B2 discloses a method for tinting a substrate selectively between different portions of the lens substrate surface by using two different surface materials. Here, a substrate having a first surface portion formed by a first material and a second surface portion formed by a second material wherein the first and the second materials are different is used. The dye source is penetrated only into the first surface portion with a first material by heating but not into the second surface with a second material. This uses the differences between the gelation or softening temperature of the materials. However, as the additional step of filming the respective spectacle lens with different surface and delicate adjustment of heating temperature are necessary, there is still a need to improve the tinting process. Further, with the filming process, it may not be easy to obtain a high-quality tinting due to the insufficient differences between the properties of the two surface materials.

There also have been approaches applying an ink receptor layer on the lens substrate in a form of a thin film. JP 3075403 describes a method of producing a tinted plastic lens by applying a hardening coating and an ink aqueous solution containing disperse dyes onto the hardening coating to a spectacle lens, by means of an ink jet printer, heat treating, and finally removing, by rinsing, and lastly, by the water-soluble polymer coating. WO 2006/079 564 A1 proposes a simplified process which coats the substrate of an optical lens with a layer of an ink receptor material capable of forming a porous ink receptor film, evaporates solvents present in the ink receptor material to form the porous film, applies an ink solution using an inkjet machine on the porous film in such conditions that the ink solution is absorbed within the film, heats the optical lens until the substrate has attained the desired tint, and then removes the ink receptor film. As such, for these methods, there is a need for applying auxiliary layers on the lens substrate. It is especially difficult to get a transparent coating and thin film coating without haze and the application and adaptation of auxiliary layer may adversely affect the lens property. Moreover, the necessary additional process steps related thereto can be cumbersome and inefficient.

EP 3 266 598 A1 appears to be the closest prior art and discloses a process for marking of optical eyeglasses. During a first step, an area of the optical eyeglass is treated by a laser beam to remove a surface coating in a detreated zone. The movements of the laser beam can be programmed to produce the pattern or an element of the pattern to be drawn on the eyeglass. Thereafter, an ink is deposited in the detreated zone in order to form the inked pattern, for example by inkjet printing. By this process, a surface coating which prevents the ink from adhering is locally removed in order to reach a layer of the ophthalmic lens having properties allowing the ink to be retained. Disadvantageously, this method is applied to an optical eyeglass with a further coating, requires a laser beam treatment, and is prone to damages due to insufficient adherences of the ink.

Therefore, there is still a need for a new selective tinting method which can provide a desired tinted pattern in an industrially effective and simple way and with high quality.

SUMMARY

It is an object of the present disclosure to provide an improved method for selectively tinting a spectacle lens, an improved tinted lens obtainable by the method, an improved lens holder, and an improved tinting device. In addition, a tinting system comprising the lens holder, a corresponding computer program, computer-readable data and a kit for carrying out the method can be also provided.

The inventors recognized the need for more sophisticated and high-quality tinting in a more easily applicable and reproducible manner. Accordingly, on one hand, as compared to the adhesive tape tinting method, the present disclosure provides the spectacle lenses with a high-quality tinting with cost efficiency and flexibility, and on the other hand, as compared to the methods using auxiliary thin film layers for tinting or additional treatments, the present disclosure enables tinting in an easily applicable and reproducible manner together with a tinting with high quality, without impairing the lens properties.

For several years, plasma treatment has been used for various applications such as surface treatment, oxidation, polymer etching, etc. Plasma treatment may induce different effects depending on the type of the subject material, plasma condition, or the type of plasma used. CN 105204180, for instance, applies the plasma treatment on a spectacle lens for depositing a plasma layer on the surface of the spectacle lens, but nonetheless fails to provide any practical application of the method.

Based on the idea of using plasma treatment for tinting spectacle lenses by delicately adjusting the surface properties of spectacle lenses, the inventors have reached the present disclosure which can address the drawbacks of the prior art.

According to a first aspect of the present disclosure, a method for selectively tinting a spectacle lens is provided. The method comprises (i) selectively plasma treating a preselected part of a surface of the spectacle lens, and (ii) providing a tinting solution at least to a part of the surface of the spectacle lens which is not treated with the plasma.

According to the second aspect of the present disclosure, a lens holder suitable for tinting a spectacle lens is provided, comprising a reception unit suitable for holding the spectacle lens in a predefined position and a masking unit suitable for masking a part of a surface of the spectacle lens when held by the reception unit in the predefined position.

The third aspect of the present disclosure is a use of a lens holder according to the second aspect for selective tinting of a spectacle lens suitable for covering a part of a surface of a spectacle lens held by the lens holder during plasma treating.

According to fourth aspect, a system or device for tinting is provided, wherein the system or device comprises the lens holder according to the second aspect, an apparatus for plasma treatment, and a tinting bath with a tinting solution.

The fifth and sixth aspects of the present disclosure provides a computer program comprising instructions which, when the program is executed by a computer, cause the computer to carry out the steps of the method according to the first aspect of the present disclosure and a computer-readable data carrier or data signal comprising instructions which, when executed by a computer, cause the computer to carry out the method according to the first aspect of the present disclosure. Specifically, the computer program may be stored on a computer-readable, non-transitory data carrier. Thus, any one of the method steps as indicated above may be performed by using a computer or a computer network, typically by using a computer program. To be specific, a computer program may send an instruction to an apparatus suitable for treating plasma, such as plasma treatment device, and the apparatus performs plasma treating accordingly. For example, the apparatus can be programmed to conduct plasma treating at a preselected part of a spectacle lens. Further, a computer program may send an instruction to an apparatus suitable for providing a tinting solution, such as a tinting bath or tinting chamber, and the apparatus applies the tinting solution onto the spectacle lens according to the instruction.

Yet the seventh aspect of the present disclosure provides a kit comprising a lens holder according to the second aspect of the present disclosure and instructions for use of the lens holder according to the method of the first aspect of the present disclosure.

The basic idea of the present disclosure is to provide a method for tinting a spectacle lens having a surface by selectively plasma treating a preselected part of the surface of the spectacle lens so that the preselected part exposed to the plasma treatment is not tinted in a subsequent tinting step, while the surface of the spectacle lens which did not go through plasma treating is tinted. The inventors found that the plasma treatment alters the surface properties of the spectacle lens. By the plasma treatment, the exposed surface of the spectacle lens is changed in a way that tinting thereon with a tinting solution is inhibited, thereby providing highly selective application of the tinting solution to the surface of the spectacle lens which was not treated by plasma, while only altering an extremely thin region of the preselected surface of the spectacle lens so that the surface properties necessary for a spectacle lens are not substantially changed or damaged.

Throughout this specification the following definitions apply:

A spectacle lens is an ophthalmic lens worn in front of, but not in contact with, the eyeball (DIN ISO 13666:2019, section 3.5.2), where an ophthalmic lens is a lens intended to be used for purposes of measurement, correction and/or protection of the eye, or for changing its appearance (DIN ISO 13666:2019, section 3.5.1). Non-limiting examples of a spectacle lens include corrective and non-corrective spectacle lenses, including single vision or multi-vision lenses, which may be either segmented or non-segmented, as well as other elements used to correct, protect, or enhance vision, magnifying lenses and protective lenses or visors such as found in spectacles, glasses, goggles and helmets. Especially, a spectacle lens is a lens which is designed to fit a spectacles frame so as to protect the eye and/or correct the sight and can be a non-corrective (also called plano or afocal lens, for example for sunglasses, sport-specific eyeglasses or for filtering particular wavelengths) or corrective ophthalmic lens. Corrective lens may be a unifocal, a bifocal, a trifocal or a progressive lens. Accordingly, in general, in the context of the disclosure, the term "lens" or "lenses" refers to any of the above spectacle lenses.

The spectacle lens of the present disclosure is typically a "spectacle lens substrate." The term "spectacle lens substrate" refers to a piece of optical material that is used during the manufacturing process of a spectacle lens, i.e., precursors of the finished spectacle lens. Suitable precursors of the finished spectacle lens are for example semi-finished lens blanks, wherein the term "semi-finished lens blank" refers to a piece of optical material with one optically finished surface for the making of a spectacle lens (DIN ISO 13666:2019, section 3.8.1). In any case, the spectacle lens substrate as used herein exhibits at least one surface without any coatings such as AR (anti-reflective)- or HC (hard coat)-coatings which is to be used in the method described herein.

The term "lens material" refers to a material used for the manufacturing of the spectacle. The spectacle lens may comprise the lens material or consist of the lens material. The term "surface" or "spectacle lens surface" refers to any layer of the three-dimensional spectacle lens that is in direct contact with the environment. The surface can be regarded as its boundary. The surfaces of a spectacle lens substrate include its front surface, i.e., frontside; side surface, i.e., edge; and back surface, i.e., backside.

The term "masking" refers to covering a part of a surface of a spectacle lens, and protecting, in turn, the masked part of the surface of the spectacle lens from the contact with other substances or application of treatments.

The term "de-masking" means taking off or removing a cover or substance from a surface of a spectacle lens, thereby enabling the previously masked part to regain exposure to other substances or treatments.

The term "cover" means to put or lay something on, over or around a subject in order to protect the subject.

The term "preselected part" indicates a part of a surface of a spectacle lens determined not to be tinted. The selection is made prior to applying the present method. There can be at least one preselected part in the present method.

The term a "part (of a surface of a spectacle lens)" means a portion or division of a whole (surface of a spectacle lens) that is separate or distinct. The term "at least (to) a part" may indicate a portion or division of a whole and/or the whole.

The term "tinting" refers to a process of providing a tint to a spectacle lens surface. A tinted spectacle lens is a spectacle lens for which at least a part of the electromagnetic spectrum, for example the illuminant spectrum perceivable by humans (380-780 nm) and/or other spectral ranges like the NIR (780-3000 nm), UV-A (315-380 nm) and UV-B (280 nm-315 nm) range, is damped due to the addition of a further substance, i.e., not by the polymeric lens material itself. The amount of damping may be, for example, 6-99%. In case of damping within the illuminant spectrum perceivable by humans, this might lead to a luminous transmittance as defined in DIN EN ISO 8930-3:2013 of, for example, 1-94% in tinted lens areas. The luminous transmittance may be further influenced by the subsequent application of coatings, such as AR- or HC-coating. Traditionally, a tint can be obtained by dipping or immersing a substrate in a tinting bath, i.e., a liquid dye solution. The tinted substrate may exhibit a homogenous tint, i.e., a tinted area exhibits the same degree of transmission throughout the tinted area, or the tinted substrate may exhibit a tint gradient, i.e., the degree of transmission changes gradually within the tinted area.

The term "tinting solution" is to be understood as a liquid comprising a tint configured to tint a spectacle lens. The tinting solution may comprise a dye which is a colored substance that makes a lens appear in a certain tint or is used to change the tint of the spectacle lens, and may optionally comprise a swelling agent, moderating solution, a surfactant and/or a buffer. The tinting solution can be converted into a tinting vapor if necessary. The term "aqueous tinting solution" is a tinting solution in which the main solvent is water.

The term "selective tinting" means that tinting is present only at a certain desired part of a surface of a spectacle lens, thereby exhibiting tinted and non-tinted surfaces, e.g., in the form of a pattern. In the similar context, the phrase "selectively plasma treating" or "selective plasma treatment" means that plasma treatment is applied only to a certain desired (preselected) part of a surface of a spectacle lens and the rest of the surfaces are not treated by plasma.

The term "pattern" refers to any macroscopic element. For example, a selectively (locally) tinted portion of a spectacle lens, a mark, a gradient, a number, a letter of any type of graphic, a graphic representation such as a dot, symbol etc., on a spectacle lens can be deemed as a pattern.

The term "gradient" is particularly used to describe the intensity distribution of a tinting of a lens across a surface of a spectacle lens. In particular, the term "gradient tint" is used to describe a shading of a lens, more particularly a gradually varying intensity of tint on the lens, in a direction parallel to the surface of the spectacle lens, with increasing intensity in a first direction and decreasing intensity in the opposite direction. The term "border gradient tint" is used to describe a gradient tint at the border of a tinted surface and a non-tinted surface of a spectacle lens.

The term "plasma" is a cluster of particles containing equal numbers of positive ions and electrons, free radicals, and natural species created by exciting a gas in an electromagnetic or electrical field. It is a state of matter in which an ionized substance becomes highly electrically conductive to the point that long-range electric and magnetic fields dominate its behavior. Plasma contains a significant portion of charged particles, i.e., ions and/or electrons. Plasma can be artificially generated by heating a neutral gas or subjecting it to a strong electromagnetic field. The term "plasma treatment" or "plasma treating" refers to treating a subject by a plasma condition using plasma generation methods. An artificial plasma can be generated by application of electric and/or magnetic fields through a gas. For example, the generation methods can be, but not limited thereto, low pressure discharges such as glow discharge plasmas, capacitively coupled plasma (CCP), cascaded arc plasma source, inductively coupled plasma (ICP), wave heated plasma; or atmospheric pressure such as arc discharge, corona discharge, dielectric barrier discharge (DBD), capacitive discharge, atmospheric pressure glow discharge (APGD), piezoelectric direct discharge plasma; or even an ion gun (oxygen, argon, etc.).

The term "reception unit" defines a part of the lens holder being particularly configured to receive and hold one or more lenses. A reception unit is configured to hold a spectacle lens in a predefined position to realize a desired tinting pattern at a desired part of a surface of the spectacle lens. The reception unit may comprise a subunit which is configured to be mounted on at least a part of a surface of a spectacle lens. This, for example, can be an "annular mounting means," which is a subunit in an annular form configured to be mounted on the upper circumference, and optionally the outer (edge) circumference of the lens, adapted to the respective shape and surface profile (curvature) of the lens to be tinted. The annular mounting substantially matches with the circumference of the spectacle lens. The reception unit may comprise means for holding a lens, typically at least two means for holding a lens in a predefined position. However, any other construction suitable for receiving and holding a lens may be defined as reception unit. The term "means for holding a lens" or "holding means" refers to any subunits which can hold the lens during plasma treatment designed to be fitted to the side (edge shape, thickness) profile of the lens, for example, a snap-fit joint.

The term "masking means" is a construction which masks or covers at least a part of a lens surface. Any construction suitable for masking or covering a part of a surface of a spectacle lens and protecting a part of a surface of a spectacle during the plasma treating may be defined as a masking means. For example, masking means can be any type of tape (e.g., adhesive tape) which can be placed on and cover a surface of a spectacle lens, any materials suitable for covering a surface of a spectacle lens (e.g., masking agent, die-cast cover or 3D printed cover, etc.). Meanwhile, the term "masking unit" in the present disclosure is specifically used to indicate one of the components of the lens holder according to the second aspect of the present disclosure. The masking unit is a component of the lens holder and masks a surface of a spectacle lens during plasma treating.

The term "opening" in the present disclosure indicates a part of a masking means or masking unit that is open (e.g., a hole or an aperture), resulting in the part of the surface of the spectacle lens corresponding to the position of the opening of the lens holder being not covered and protected. The shape of the opening is not limited and can be selected in consideration of the desired tinting pattern.

The term "spatial protrusion" is a hollow part of a masking unit of the lens holder which is extended above the average surface of the masking unit, thereby forming a spatial gap therebetween.

The articles "a," "an," and "the" as used in this specification and the appended claims include plural referents unless expressly and unequivocally limited to one referent.

The method for tinting a spectacle lens having a surface according to the first aspect of the present disclosure comprises (i) selectively plasma treating a preselected part of a surface of a spectacle lens, and (ii) providing a tinting solution at least to a part of the surface of the spectacle lens not treated by the plasma.

At the step of selectively plasma treating a preselected part of a surface of a spectacle lens, plasma is applied only to the preselected part. The preselected part of the surface of the spectacle lens treated by plasma will not be tinted in the subsequent tinting step, while the remaining parts of the surface of the spectacle lens (i.e., the surface other than preselected part(s)) not treated by plasma will be tinted. The preselected part will be determined depending on a desired tinting pattern, keeping in mind that the preselected part will not be tinted and the rest of the surface of the lens spectacle will be tinted.

Plasma treatment may be done on a surface of a spectacle lens having a surface, specifically, front, side and/or, back surface, without any coatings such as AR (anti-reflective)- or HC (hard coat)-coatings. In this case, the spectacle lens is typically a spectacle lens substrate. That is, plasma treating is performed on a surface of a spectacle lens without any additional lens coatings or lens layers, which was required and made the process of the prior art (for example, laser beam treatment) inefficient. The reduced number of coating layers decreases the investment into coating machinery at the initial stage. This also improves the lens durability due to the reduction of interfaces as well as the adhesion of the overall coating stack.

Plasma treating is performed onto a spectacle lens or a surface of a spectacle lens, typically on a surface of a spectacle lens surface, more typically perpendicularly to the center of the surface of the spectacle lens.

In the present disclosure, as the step of plasma treating, which results in distinctive properties between the preselected part of the surface treated by plasma and the part of the surface not treated by plasma, is completed before providing a tinting solution to the spectacle lens, there are no disadvantages of liquid infiltration due to poor adhesion of the masking means caused by the tinting solution penetrating beneath the masking means which leads to inhomogeneous tinting. Further, since the selective tinting is achieved by different properties of the respective parts of the surface of the spectacle lens, the tinting quality produced during the tinting step will be less affected by masking itself (but rather by the plasma treatment condition) compared to the prior art where the tinting quality depends on the adhesion or the quality of the masking means.

In one exemplary embodiment, the step of selectively plasma treating a preselected part of a surface of a spectacle lens comprises the steps of masking a part of the surface of the spectacle lens other than the preselected part prior to the plasma treating, and de-masking the masked part of the surface of the spectacle lens after the plasma treating and prior to providing the tinting solution to the spectacle lens. That is, selective plasma treatment on the preselected part will be achieved by masking a part of the surface of the spectacle lens except for the preselected part so that the masked part is protected during plasma treating. The de-masking step will take place after the plasma treatment and before providing a tinting solution to the spectacle lens.

In a further exemplary embodiment, a masking means may be used for masking. A masking means can be any construction suitable for covering and protecting a part of a surface of a spectacle lens during and from the plasma treatment. For example, masking means can be any type of tape (e.g., adhesive tape) which can be placed on and cover the lens surface, and any materials suitable for covering the lens surface (e.g., masking agent, die-cast cover or 3D printed cover, etc.). In this exemplary embodiment, a masking means is placed on a part or parts of the surface of the spectacle lens other than the preselected part of the surface of the spectacle lens during the step of plasma treating. The masking means is removed at the de-masking step and a tinting solution is then provided to the spectacle lens.

In an exemplary embodiment, the masking means may be a lens holder according to the second aspect of the present disclosure, which comprises a reception unit and a masking unit.

In this regard, the present disclosure is completely different from the conventional tinting or masking method which uses adhesive tape or masking agent in that the masking tape or masking agent is adhered to the lens during the tinting step and is in contact with the tinting solution. Further, it is also different from the laser beam treatment of the EP 3 266 598 A1 in that a part not to be tinted is exposed and a part to be tinted is covered.

A spectacle lens comprising any conventional and known material can be used for the present method. In a typical exemplary embodiment, the spectacle lens comprises a polymeric lens material. Polymeric lens materials which can be used in the context of the disclosure are those conventionally used in optics and in ophthalmology. Suitable lens materials are for example of the following types: polyamide, polycarbonate, polyimide, polysulfone, copolymers of poly (ethylene terephthalate) and polycarbonate, polyolefins, polyurethane, and polythiourethane. Specific examples for particularly suitable lens materials are polycarbonate or polyamide. When exposed to the plasma treatment, polymers go through the formation of cross-linking of polymer chains on the surface of the spectacle lens, thereby causing inhibition of tinting by a tinting solution at the later stage. A spectacle lens comprising polyamide or polycarbonate as a lens material was found to show most distinction in this regard between the plasma treated and untreated surfaces.

Plasma treatment is selectively done at the preselected part of a surface of a spectacle lens to inhibit tinting at the preselected part. In one exemplary embodiment, a spectacle lens masked with a masking means or a lens holder is treated by plasma. Plasma treatment of material surfaces is a well-developed technique to produce controlled surface modification (Zhou et al., Investigation of surface properties of plasma-modified polyamide 6 and polyamide 6/layered silicate nanocomposites, J Mater Sci (2011) 46: 3084-3093; Poncin-Epaillard, Illustration of surface crosslinking of different polymers treated in argon plasma, Macromol. Chem. Phys. 198, 2439-2456 (1997)). The presence of species such as positive ions, electrons free radicals, and natural species in the plasma induce the surface property changes in a subject material. Particularly in polymers, plasma is known to induce formation of free radicals in the polymeric chains and hence serves to activate the polymeric surface by e.g., cross-linking, etching, activation, etc. The type of reactions occurring on a surface may depend on the plasma conditions, subject material, plasma source, etc. In the typical exemplary embodiment of the method, for the subsequent step of providing a tinting solution, the intensity of the treated plasma should be sufficient to induce changes in surface properties of the exposed (preselected) part of the surface of the spectacle lens. For example, in case of a polymeric spectacle lens, plasma should be able to induce cross-linking on the surface, leading to physically tightening the exposed lens surface, thereby inhibiting a tinting solution from entering into the exposed (preselected) part of the surface of the spectacle lens and resulting the preselected part not to be tinted. By the cross-linking on the preselected part of the surface of the polymeric spectacle lens which was treated by plasma, the preselected part will be inhibited from tinting in the subsequent tinting step.

To allow for selective tinting with distinctive tinting pattern and high quality, the plasma conditions should be selected properly. As different materials with different properties may be combined within the scope of the disclosure, it is not possible to indicate a certain condition that can be used for all possible lens materials and all possible apparatus for plasma generation. Still, the skilled person will be able to determine a set of suitable plasma conditions considering the following restrictions.

In this regard, it is typical when the direct current of plasma can be from 50 to 1,000 mA, more typically from 50 to 500 mA, most typically from 100 to 300 mA. Further, in an exemplary embodiment, the direct current tension can be from 100 V to 10,000 V, more typically from 100 V to 1,000 V. In another exemplary embodiment, the pressure during plasma treatment can be from 0.001 Pa to 100 Pa, typically from 0.001 Pa to 50 Pa, more typically from 0.001 Pa to 10 Pa. The pressure during plasma may differ depending on the type of plasma generation apparatus and/or the direct current or tension of the plasma. Plasma conditions weaker than these ranges would not be able to achieve a surface property change that inhibits tinting on the preselected part and therefore allows a selective and distinct tinting. On the other hand, too strong plasma conditions may lead to damages or deterioration of lens properties of the preselected part.

It is typical that the duration of plasma treatment is about 10 minutes or less, typically from 10 seconds to 5 minutes, since a longer exposure to plasma may result in poorer properties of the lens. However, the duration of time may differ depending on the type and/or intensity of the applied plasma (e.g., plasma current and plasma tension). Plasma treatment can be performed by any conventionally used industrial means for generating plasma as long as the means can provide the conditions described above.

Particularly typical plasma generation means are not limited thereto but can be those using a gas discharge. Typically, the gas can be at least one selected from the group consisting of oxygen (O), nitrogen (N), argon (Ar), carbon dioxide ($CO_2$), helium (He), xenon (Xe) and air, typically, oxygen (O), argon (Ar) and air. While not specifically limited thereto, in one exemplary embodiment, glow discharge plasma, which is plasma formed by the passage of electric current through a gas, can be used. In another exemplary embodiment, ion gun plasma, which is more compact, can be also used.

After the plasma treating, a tinting solution is provided at least to a surface of the spectacle lens not treated by the plasma. In one exemplary embodiment, the tinting solution can be provided to the whole surface of the lens, e.g., by immersing the lens as a whole into the tinting bath comprising a tinting solution, etc. This is possible as the properties of the preselected part of the surface of the lens selectively treated by plasma in the previous step will be altered so that the tinting solution no longer can be applied thereto. In another exemplary embodiment, the tinting solution can be provided in such a way that a tint gradient is obtained, e.g., by immersing the spectacle lens into a tinting bath and removing it gradually from the bath such that the longer a part of the lens is exposed to the tint the darker it becomes.

Any tinting solution suitable for tinting a spectacle lens can be used. For example, the tinting solution disclosed in US 20070294841 A1, EP 2 966 484 B1, or U.S. Pat. No. 5,453,100 A can be used and incorporated herein by reference. In one exemplary embodiment, the tinting solution can be converted into tinting vapor. The tinting solution provides selective tinting on the part of the surface of the spectacle lens which was not treated by plasma due to selective plasma treating or masking. The tinting solution cannot tint the preselected part of the surface of the spectacle lens exposed and treated by plasma. In case of a spectacle lens comprising polymeric lens material, this is because of the cross-linking on the surface of the polymeric spectacle lens caused by the plasma treatment.

In an exemplary embodiment, the tinting solution is an aqueous tinting solution. The aqueous tinting solution was found to provide more effective and distinctive selective tinting pattern on the surface of the spectacle lens, due to its relatively higher reactivity to the part of the surface not treated by the plasma as compared to the preselected part of surface treated by the plasma. In another exemplary embodiment, the aqueous tinting solution can be used for tinting a polymeric spectacle lens.

Further, the tinting solution comprises at least one dye. The dye should be suitable for tinting a spectacle lens.

The tinting solution may further comprise a swelling agent (also referred to as an impregnating solvent). Generally, the swelling agent lets the dyes enter the surface of the spectacle lens to facilitate the dyeing process, however, after the plasma treatment, the surface of the spectacle lens goes through property change and makes the swelling agent ineffective. The swelling agent of the present disclosure selectively functions on the part of surface of the spectacle lens not treated by plasma, but does not function at the preselected part of the surface of the spectacle lens selectively plasma treated, by impregnating thereto. Therefore, the swelling agent further results in more distinct tinting on the part of the surface of the spectacle lens not treated by plasma. The chosen swelling agent may depend in part on the type of lens material. Exemplary agents include glycol ethers such as dipropylene glycol monomethyl ether (DPM), tripropylene glycol mononethyl ether (TPM), and propylene glycol monomethyl ether (PM); alcohols such as glycol, aromatic alcohol, non-aromatic alcohol, etc.; and/or aromatic compounds such as xylene, toluene, benzene, etc. It was found that alcohols as swelling agent provide the most selective tinting after plasma treatment, more typically, aromatic alcohols such as o-phenylphenol, benzyl alcohol. The effect is even remarkable when these types of swelling agents are used in an aqueous tinting solution for tinting a polymeric spectacle lens.

In another exemplary embodiment, the tinting solution may further comprise a moderating solvent. As the swelling agent attacks the surface of the spectacle lens and enables impregnation of the dye, the moderating solvent is blended with the swelling agent and acts as a diluent and wetting agent and reduces the aggressiveness of the swelling agent. The moderating solvent can be for example, propylene glycol (PG), 1,4 butane diol, or ethylene glycol monobutyl ether (EB).

The molar ratio between the dye and the swelling agent is not limited but typically can vary from 0.01 mol % and 5.00 mol %, typically between 0.05 mol % and 2.00 mol %.

In a further exemplary embodiment, the tinting solution may further comprise a surfactant and/or a buffer to facilitate the mixing of the solution and to further improve the impregnation of the dye into a surface of a spectacle lens. The surfactant is not limited there to but, may comprise at least one selected from the group consisting of linear alkylbenzene sulfonates, lignin sulfonates, fatty alcohol ethoxylates, and alkylphenol ethoxylates. A buffer may be used to reduce the aggressiveness of the tinting solution or to adjust the pH. Examples of the buffer may comprise at least one selected from the group consisting of citric acid and acetic acid.

With this method, the tinting solution and pattern can be directly applied on a surface of a spectacle lens. Auxiliary layers such as primer layers are not needed. Thus, the method is easily applicable and cost-effective to implement.

The method of the present disclosure may further comprise a step of removing the tinting solution from a surface of a spectacle lens. Thereafter, the method of the present disclosure may further comprise the coating step, for example, AR or HC coating, mirror coating, photochromic coating, polarizing coating, top coating, etc.

The lens holder according to the second aspect of the present disclosure aims to protect a part of a surface of a spectacle lens from the plasma treating. The lens holder comprises a reception unit suitable for holding the spectacle lens in a predefined position and a masking unit suitable for masking a part of a surface of a spectacle lens when held by the reception unit in the predefined position. The lens holder can be in any form as long as it can provide the required functions and can be manufactured by using any conventional method.

In one exemplary embodiment, the lens holder may be manufactured by additive manufacturing (AM), also known as 3D printing. This provides high flexibility in designing the lens holder without any limitation, which in turn, leads to high flexibility of tinting patterns.

3D printing is the construction of a three-dimensional object from a CAD (computer-aided design) model or a digital 3D model, layer upon layer, in precise geometric shapes. This manufacture process is implemented directly on the basis of computer-internal data models from formless (e.g., liquids, powder, and the like) or form-neutral (band-shaped, wire-shaped) material by means of chemical and/or physical processes. Although these are primary forming methods, no special tools that have stored the respective geometry of the workpiece (e.g., molds) are required for a specific product. The current related art is conveyed by the VDI Statusreport AM 2014. An overview of current 3D printing methods is provided by 3druck.com/grundkurs-3d-drucker/teil-2-uebersicht-der-aktuellen-3d-druckverfahren-462146/, last accessed Feb. 15, 2022.

The method of Multi-Jet modeling, Multi-Jet fusion or Poly-Jet printing was found to be particularly suitable. This method is described, for example, at the URL de.wikipedia.org/wiki/Multi_Jet_Modeling, the URL www.materialise.com/en/manufacturing/3d-printing-technology/multi-jet-fusion, the URL www.materialise.com/de/manufacturing/3d-druck-technologien/polyjet, or the URL www.stratasys.com/polyjet-technology, respectively retrieved on Feb. 15, 2022. Alternatively, stereolithography (SLA; see en.wikipedia.org/wiki/Stereolithography), selective laser sintering (SLS; see en.wikipedia.org/wiki/Selective_laser_sintering), selective laser melting (SLM; en.wikipedia.org/wiki/Selective_laser_melting), or fused deposition modeling (FDM; de.wikipedia.org/wiki/Fused_Deposition_Modeling) can be also used. In an exemplary embodiment, 3D printing method can be Multi-Jet Fusion, which involves no laser and thus provides higher throughput and very good surface quality.

By applying the 3D printing when manufacturing the lens holder, further increased flexibility to design and test lens holder is offered. Any tinting pattern including very complicated and/or small patterns can be achieved without any technical difficulties.

All printable plastic materials can be used for the lens holder. Metals are generally avoided to reduce possible scratches on the lens. Plastic materials are particularly typical as the lens holder is provided on a spectacle lens without additional coatings such as AR (anti-reflective)- or HC (hard coat)-coatings. More specifically, plastic materials printable from powder using Multi-Jet Fusion is typical due to their lower cost, higher print throughput and no need for supporting parts. In an exemplary embodiment, the material of the lens holder can be polyamide or polyurethane due to its good thermal and mechanical resistance, low cost and compatibility with Multi-Jet Fusion, however, not limited thereto.

Due to its excellent durability, the lens holder of the present disclosure can be used multiple times on a plurality of lenses and is reusable contrary to adhesive tapes used for tape tinting. This means that the lens holder can go through multiple cycles of plasma treatment after being detached from the spectacle lens which already went through the plasma treatment. Therefore, there would be no need to produce the lens holder with the number corresponding to the number of lenses to be tinted, which is often the case with the tape tinting where the corresponding numbers of masks must be produced, and also the case with the laser beam treatment which should treat each and every lens with the laser beam for the desired pattern. With this lens holder, the present disclosure can provide cost effective, environmental, and efficient tinting.

The reception unit of the lens holder is suitable for holding a spectacle lens in a predefined position so that a desired pattern can be obtained at a desired location on the spectacle lens (a part corresponding to the position of the masking unit).

In one exemplary embodiment, the reception unit and the masking unit of the lens holder are connected to each other. By being connected to each other, the reception unit and the masking unit forms a lens holder as a single unit. As will be explained below, this may be embodied by a connection unit or a continuous surface between the masking unit and the reception unit.

In another exemplary embodiment, the reception unit may comprise a subunit which is configured to be mounted on at least a part of a surface of a spectacle lens. In a further exemplary embodiment, the subunit can be an annular mounting means surrounding at least the upper circumferential surface of the lens. This annular mounting means can be designed to substantially match with the upper and/or outer (side) circumference of the spectacle lens to be mounted upon. The annular mounting means may be configured to provide rigidity and mechanical strength to the reception unit for holding a spectacle lens by holding the outer and/or upper circumference of a spectacle lens. As the circumferential part of the spectacle lens that is covered by the annular mounting means will not go through the plasma treatment, this part will be tinted in the subsequent tinting step. Therefore, the part of the lens will be cut from the spectacle lens at a proper finishing step, if necessary. In one exemplary embodiment, the width of the annular mounting means may be up to 15 mm, typically between 1 mm and 10 mm. The width over 15 mm would be unpractical and the width below 1 mm would jeopardize the mechanical strength of the lens holder.

The reception unit may further comprise a means for holding a spectacle lens, typically at least two means for holding the lens, which are attachable and detachable from the lens or can be assembled with and disassembled from the lens. The means for holding the lens can be in any form which can be attached to/assembled with and then detached from/dissembled from the lens so that the lens holder is not moved during the plasma treatment. In one exemplary embodiment, the holding means is configured so that it fits the respective thickness and edge profiles of the spectacle lens to be tinted and fastens the lens.

In an exemplary embodiment, the holding means can be a snap-fit. A snap-fit is an assembly method used to attach two respective components so that they interlock together. In such a case, the lens may be designed to have a corresponding component to be interlocked with the holding means. For example, in a case where a spectacle lens is manufactured by injection molding and has a unique edge shape due to the injection molding, the holding means may be configured to match the edge profiles of the lens so that it can hold the lens. In this exemplary embodiment, the holding means may serve as a marking means for marking the alignment position of the lens holder as well. That is, by assembling the holding means to the corresponding positions of the lens, the lens holder will be positioned according to the desired alignment with the lens as well as be fixed with the lens so that the part not desired to be tinted is exposed and the part desired to be tinted is not exposed during the plasma treatment, which, in turn, leads to a tinting pattern at a precise position.

The holding means can be positioned by a certain angle to one another which ensures fixing and fastening the lens during the plasma treatment. For example, the two means may be displaced at the two symmetrical points of the annular mounting means, in other words, 180° apart from each other, or, between 90° to 180° from each other.

In one exemplary embodiment, the lens holder may further comprise at least one, typically at least two, marking means for marking the alignment positions on the lens. In this case, the lens may also have the markings at the corresponding positions of the upper and/or outer circumferential surface of the lens. With this, the lens holder can be easily aligned with the lens at the correct position, thereby obtaining a desired tinting pattern exactly at a desired position. In one exemplary embodiment, in a case where the lens is manufactured by injection molding and has a unique edge shape due to the injection molding, the marking means may be configured to match the edge profile of the lens so that it can fit to the lens at a desired position.

The lens holder further comprises a masking unit configured to mask a part of a surface of a spectacle lens and to protect the part of surface of the spectacle lens during the plasma treatment. The masking unit is designed to be positioned at a part of a surface of a spectacle lens where a desired tinting should be obtained. The masking unit can be designed into any desired shape considering that only the masked part of the surface of the spectacle lens is tinted later at the tinting step.

In one exemplary embodiment, the masking unit can be an independent unit which is separately and independently located from the reception unit. The masking unit will be connected to the reception unit through at least one connecting unit which is configured to connect the masking unit and the reception unit without having a contact with the lens. For example, the connecting unit can be in a form of a bridge, which is configured to have no contact with the lens, but only with the reception unit and the masking unit. With this configuration, high flexibility of tinting pattern design can be offered. Even very small and/or complicated patterns can be easily obtained with a high-quality tinting. This resolves the constraint of tape tinting where a tinting pattern which is not connected to the lens border can hardly be realized with precision due to difficulties in alignment. In one exemplary embodiment, the connecting unit can be on the holding means and/or the annular mounting means of the lens holder.

In an exemplary embodiment, the thickness of the connecting unit is up to 10 mm, more typically 0.1 mm to 5 mm, and most typically 0.5 mm to 1.5 mm. If the bridging unit is too thick, unwanted shading on the corresponding surface of the spectacle lens will be resulted. In another exemplary embodiment, the height of the connecting unit from the surface of the spectacle lens can be up to 20 mm, more typically 5 mm to 15 mm.

In another exemplary embodiment, the masking unit and the reception unit form a single unit having a continuous surface. The masking unit is configured to cover a part corresponding to a part of a surface of a spectacle lens to be tinted and to comprise at least one opening at a part corresponding to the preselected part of a surface of a spectacle lens desired to be not tinted and subject to selective plasma treating. The form of opening can be in any form and can be designed in consideration of the desired tinting pattern.

In a further exemplary embodiment, the lens holder can be suitable for providing a tinting pattern with a gradient tinting at the border of the tinted and non-tinted surfaces, which is hereinafter referred to as border gradient tinting. For this, the height between a part of the masking unit and a surface of a spectacle lens where the border gradient tinting is provided can be adjusted. The higher the height of the part of the masking unit from the surface of the spectacle lens, the smoother the transition of the gradient of the pattern gets. By providing a spatial protrusion in the masking unit, thereby creating a spatial, vertical room between the masking unit and the surface of the spectacle lens, the surface of the spectacle lens corresponding to the location of the spatial protrusion goes through an adjusted intensity of plasma treatment, thereby resulting in a border gradient tinting, i.e., a gradient tinting at the border. In this regard, according to the lens holder of this exemplary embodiment, a spectacle lens with border gradient tinting can be obtained. This tinted spectacle lens is obtainable by any one of the methods for selective tinting of a spectacle lens described above and the lens holder described in this regard.

BRIEF DESCRIPTION OF THE DRAWINGS

The disclosure will now be described with reference to the drawings wherein.

DETAILED DESCRIPTION OF EXEMPLARY EMBODIMENTS

Figure 1:
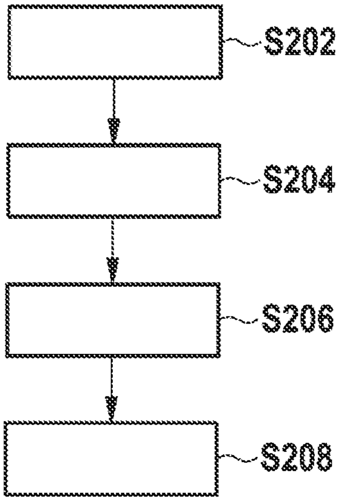
FIG. 1 illustrates a flowchart of a method for tinting a spectacle lens having a surface processed by selective plasma treating, according to the first aspect of the present disclosure.

FIG. 1 shows a flowchart of the method for tinting according to the first aspect of the present disclosure. In a first step S202, a preselected part of a surface of a spectacle lens is selected in consideration of a desired tinting pattern. That is, a part of the surface of the spectacle lens not desired to be tinted is selected as the preselected part. In an exemplary embodiment where a part of a surface of the spectacle lens is masked for the selective plasma treating, a spectacle lens (or a plurality of lenses) is assembled with/attached to a masking means or a lens holder, wherein the masking means covers a part (or parts) of the surface of the spectacle lens other than the preselected part.

In a second step S204, the preselected part of the surface of the spectacle lens is selectively treated by plasma. In the exemplary embodiment using a masking step, the spectacle lens assembled with/attached to the masking means or the lens holder goes through plasma treatment, thereby only the preselected part is exposed to the plasma.

In a third step S206, a tinting solution comprising a dye suitable for dyeing a spectacle lens is provided. The lens will be immersed (partly or as a whole) into the tinting solution to obtain a desired tinting. In the exemplary embodiment of using a masking step or masking means, the masking means will be removed from the lens before the tinting solution is provided. That is, only the spectacle lens is immersed into the tinting solution.

This step may further comprise reciprocating the lens in and out of the tinting solution for gradient tinting. In a case where a selective gradient tinting is desired, if a lens is immersed completely or partly in the tinting solution, then the lens is subsequently moved at least partially out of the tinting solution with a swinging movement in and out of the tinting solution to achieve the desired color degradation in terms of color hue and intensity.

In a fourth step S208, a spectacle lens with a desired tinting pattern is obtained.

A step of removing the tinting solution from the surface of the spectacle lens and an eventual and optional coating step, for example, AR or HC coatings, take place after the fourth step S208.

Figure 2:
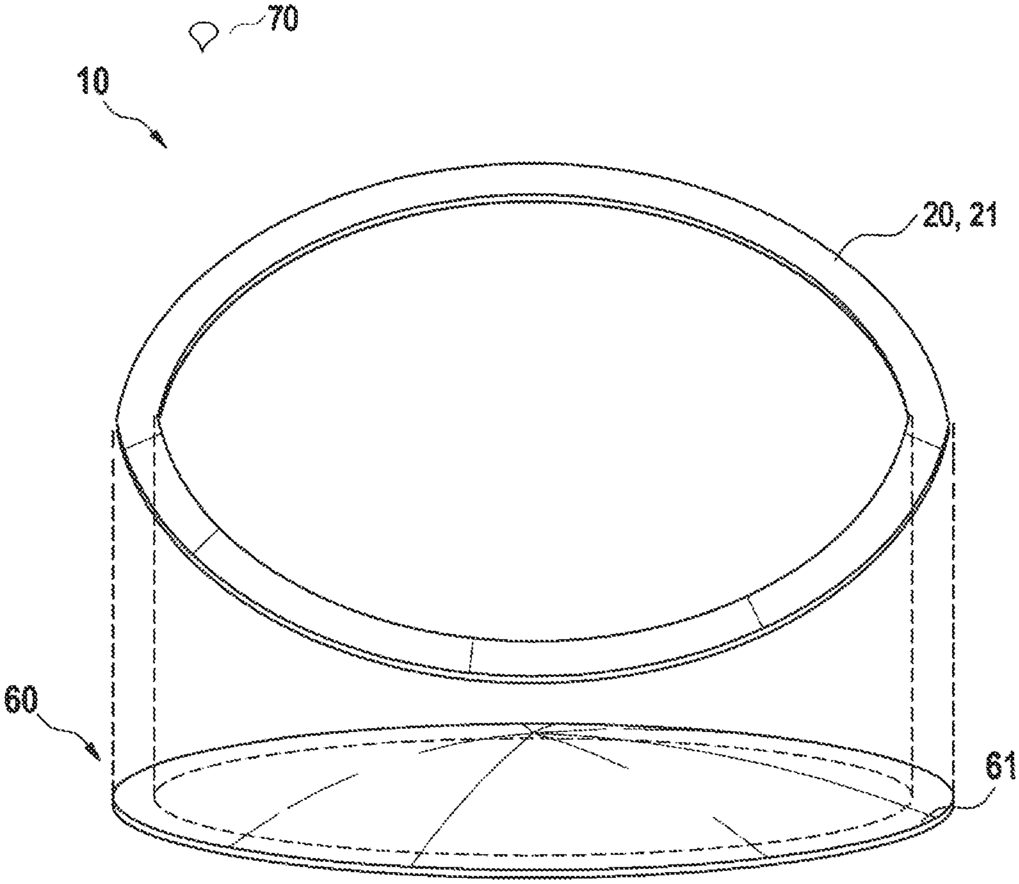
FIG. 2 illustrates a lens holder and a lens to be aligned with the lens holder according to the second aspect of the present disclosure, only with the reception unit. The masking unit is omitted for an easy understanding.

FIG. 2 shows a lens holder 10 for tinting a spectacle lens 60 configured to protect a surface of the spectacle lens 60 during the selective plasma treatment. The lens holder comprises a reception unit 20 and a masking unit (not shown). In FIG. 2, the masking unit is omitted to show the clear configuration of the reception unit. The lens holder 10 and the spectacle lens 60 will be aligned on the surface of the spectacle lens 60 to be tinted as depicted in FIG. 2 by the reception unit 20 configured to hold the spectacle lens 60 in a predefined position. The lens holder 10 comprises a reception unit 20 and a masking unit (not shown). The reception unit 20 may comprise an annular mounting means 21. The annular mounting means 21 is aligned to match with the upper circumferential surface 61 of the lens 60. The thickness may be from 0.1 mm to 20 mm. The upper circumferential surface 61 of the lens 60 is a part of a lens that may be cut or removed after tinting if not needed. After the lens holder 10 is detached from the spectacle lens 60, a tinting solution 70 can be applied to at least a part of the surface of the spectacle lens 60.

Figure 3A:
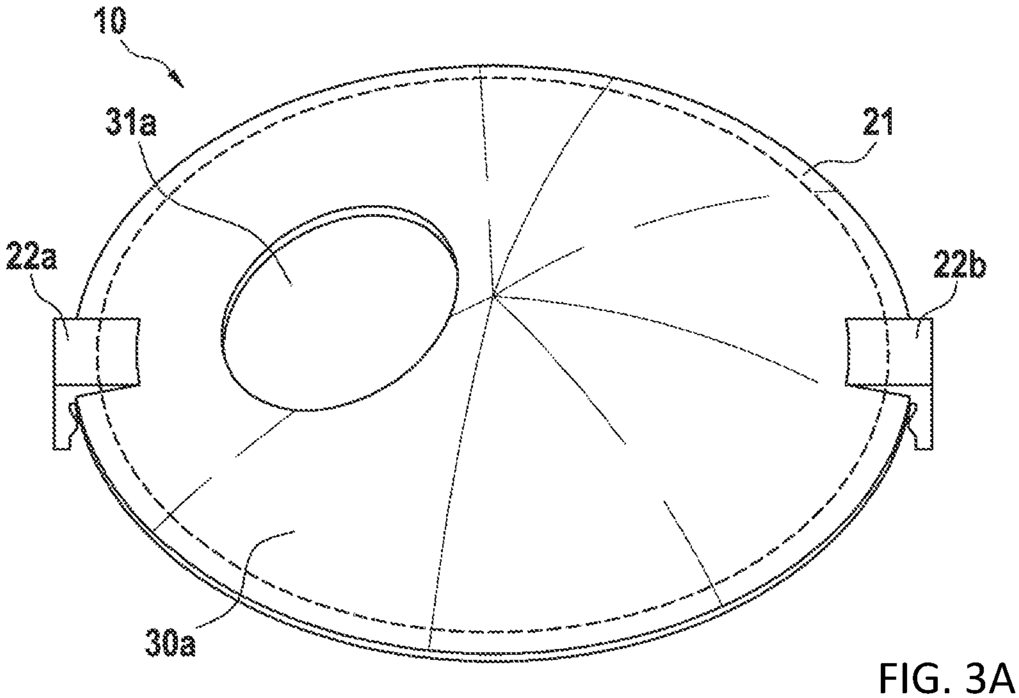
FIGS. 3A and 3B illustrate the first exemplary embodiment of the present lens holder comprising a reception unit and a masking unit as a single unit, thereby used for positive tinting.

FIG. 3A provides the first exemplary embodiment of the present lens holder 10 wherein a lens holder 10 comprises (i) a reception unit 20 configured to hold the spectacle lens 60 in a predefined position comprising an annular mounting means 21 and at least two holding means 22*a*, 22*b*, and (ii) a masking unit 30*a*. Here, the masking unit 30*a* and the reception unit 20 are configured as a single unit with a continuous surface. The masking unit 30*a* comprises an opening 31*a* where the corresponding surface of the spectacle lens will be exposed to the plasma treatment. Here, the opening 31*a* is depicted as a circular shape for simplicity, but it can be easily understood from already provided details that the opening 31*a* can be designed in a flexible fashion. With this, a desired tinting pattern identical to the shape of the masking unit 30*a* without the opening 31*a* will be obtained in the tinting step. The lens holder 10 provides a positive tinting wherein the part of the surface of the spectacle lens 61, 63 which was covered with the annular mounting means 21 and the masking unit 30*a* are tinted at the later tinting step. Here, the reception unit 10 comprises two holding means 22*a*, 22*b* which provide a fixed holding of a lens to protect the covered part of the lens surface during plasma treating for an exemplary purpose. The holding means 22*a*, 22*b* are designed to fit with the edge profile of the lens.

Figure 3B:
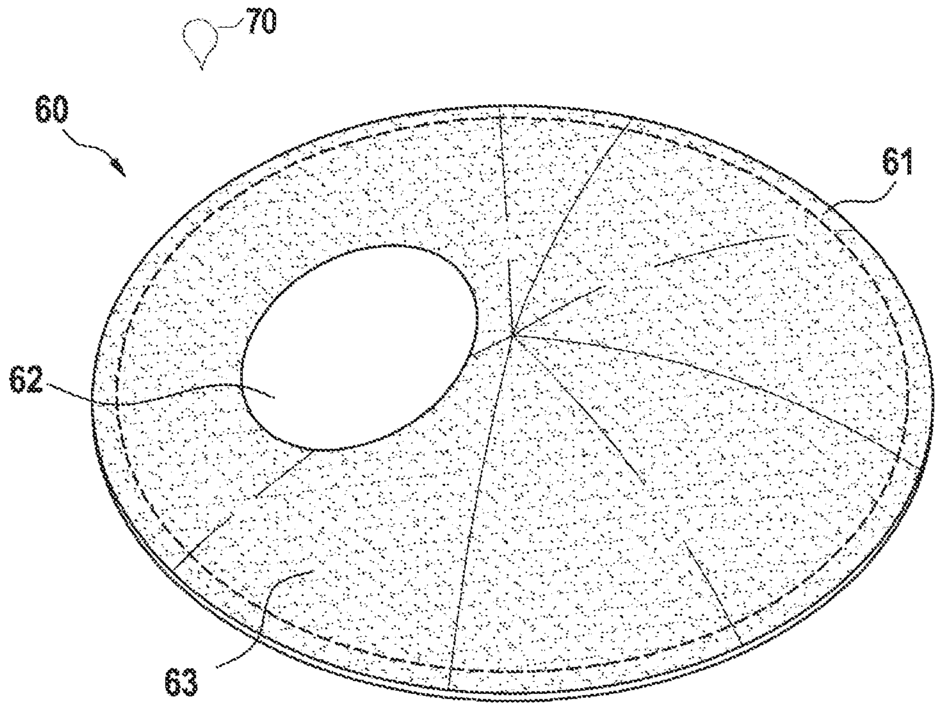

Using 3D printing, a more flexible design of the lens holder 10, even with very small openings or openings with a complicated shape can be obtained. The number and/or shape of openings may vary depending on the desired tinting patterns. The surface of the spectacle lens 60 corresponding to opening 31*a* will be exposed during the plasma treatment and is, in turn, not tinted at the later tinting step. After the plasma treatment, the lens holder 10 will be removed from the lens 60 and a tinting solution 70 will be provided to the spectacle lens 60. As a result, the lens 60 with a tinting pattern 61, 63 and a non-tinted surface 62 is obtained as shown in FIG. 3B.

Figure 4A:
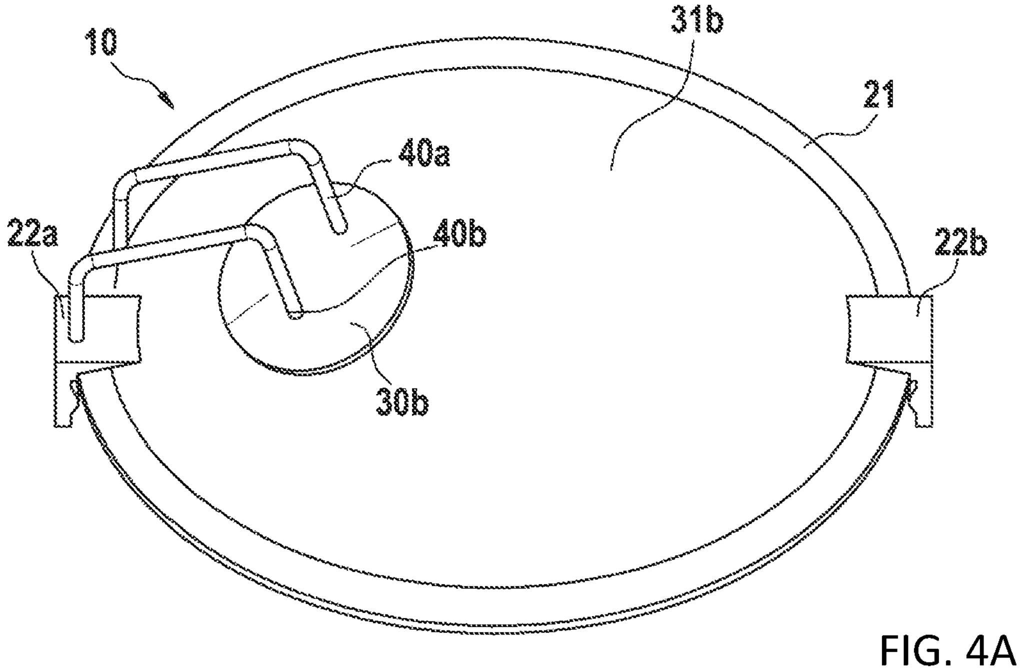
FIGS. 4A and 4B illustrate the second exemplary embodiment of the present lens holder comprising a reception unit, a masking unit, and a connecting unit as separate units, thereby used for negative tinting.
Figure 4B:
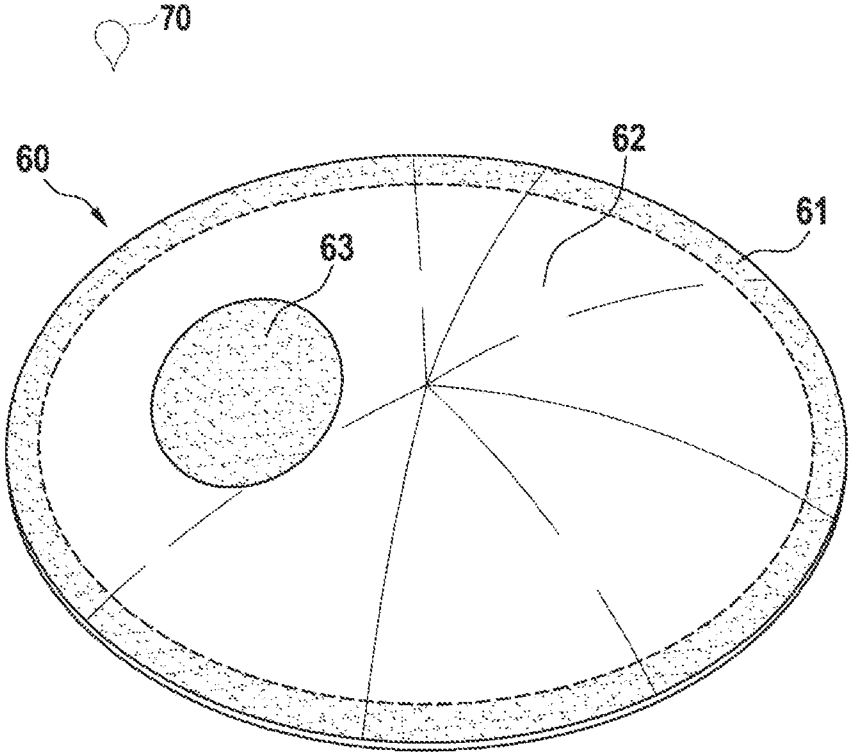

FIG. 4A provides the second exemplary embodiment of the present lens holder 10 wherein the lens holder 10 comprises (i) a reception unit 20 comprising an annular mounting means 21 and at least two holding means 22*a*, 22*b*, and (ii) a masking unit 30*b*, which is a unit independently and separately positioned from the reception unit 20. The masking unit 30*b* is connected to the reception unit 20 with at least one connecting unit 40*a*, 40*b*. The masking unit 30*b* can be connected to the annular mounting means 21 and/or the holding means 22*a*, 22*b*. The connecting units 40*a*, 40*b* are configured not to have a contact with or not to cover the lens surface such that the lens surface underneath the connecting units 40*a*, 40*b* is subject to the plasma treating and therefore is not tinted at the later tinting step. For this, the thickness and height of the connecting units 40*a*, 40*b* may be adjusted as described in the relevant part above. The number and/or shape of the connecting units 40*a*, 40*b* may vary and can be selected to enable a firm connection between the reception unit 20 and the masking unit 30*b*, thereby the masking unit 30*b* is not moved during the plasma treatment to secure a high-quality tinting pattern. Although in FIG. 4A only one masking unit 30*b* having a circular shape is provided, it should be understood that this is for an explanatory purpose. It can be easily understood that the number and/or shape of the masking unit 30*b* (accordingly, those of the connecting units as well) can be freely adjusted depending on the desired tinting pattern. The remaining parts will be the opening 31*b* of the lens holder 10. The part of the surface of the spectacle lens 62 corresponding to the opening 31*b* of the lens holder 10 will be subject to the plasma treatment, and thus have a non-tinted surface 62, while the masked parts of surface 61, 63 will not be subject to plasma treatment and therefore will have a tinted surface 61, 63. With this, the present disclosure is able to provide the positive tinting as well as the negative tinting as shown in FIG. 4B. The tinted upper circumferential part of the lens 61 can be cut at the finishing step as necessary.

Figure 5A:
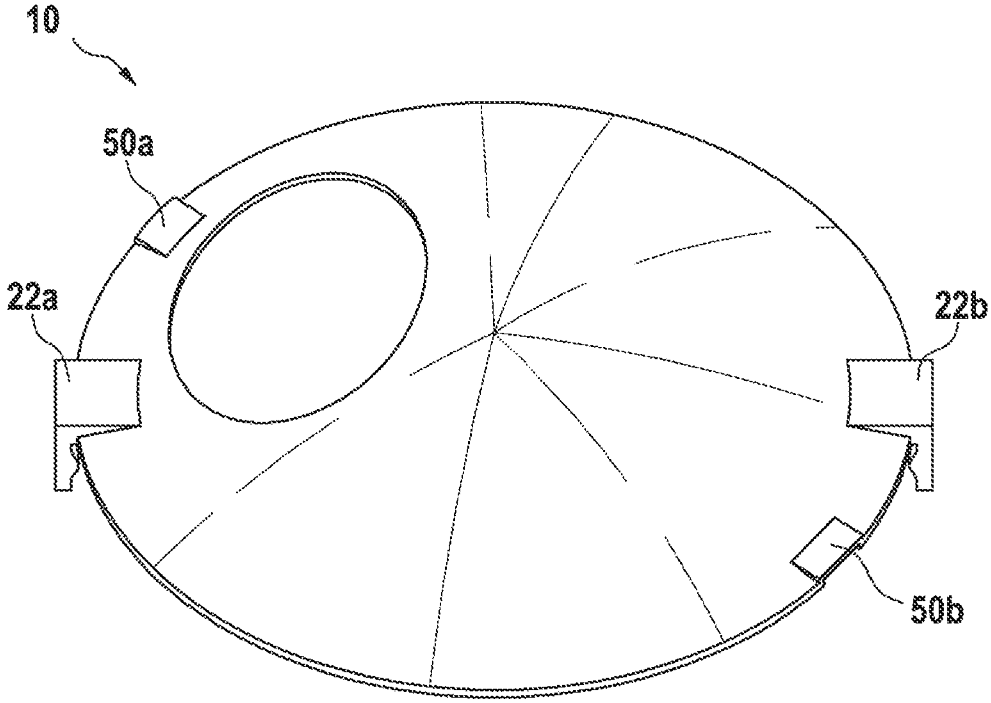
FIGS. 5A and 5B illustrate the third exemplary embodiment of the present lens holder wherein the reception unit comprises at least two marking units and corresponding lens thereof.
Figure 5B:
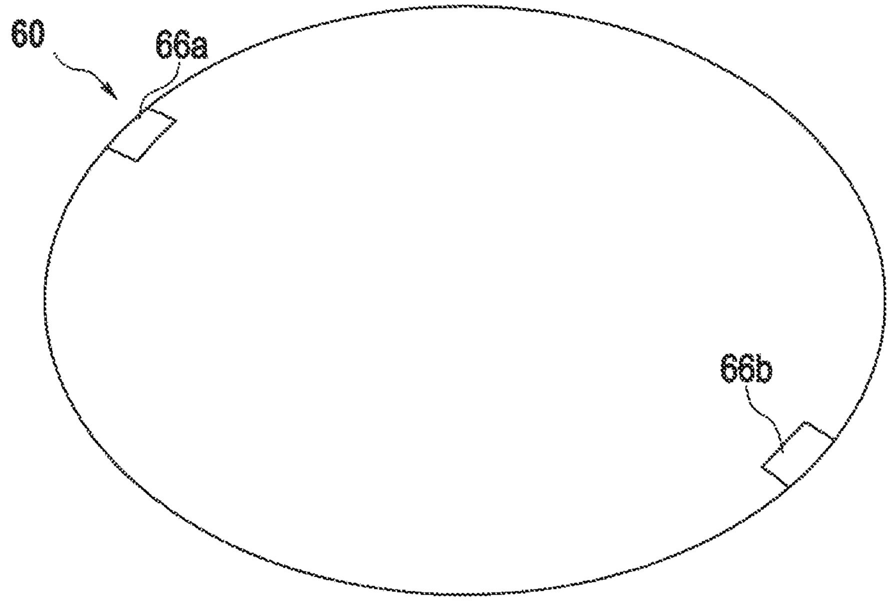

FIGS. 5A and 5B provide the third exemplary embodiment of a lens holder 10 according to the first or second exemplary embodiment which further comprises at least one marking units 50*a*, 50*b* configured to mark the alignment position of the lens holder 10 on the spectacle lens. The marking units 50*a*, 50*b* are not limited to the exemplary embodiments depicted here in the drawings but can be in any form as long as they can assist the precise alignment of the lens holder 10 on the lens 60 to provide the desired tinting pattern 63 at the desired position. In this exemplary embodiment, the lens 60 will also have the portions 66*a*, 66*b* corresponding to those of the marking unit 50*a*, 50*b* at the upper and/or outer circumferential surface of the lens 60. With this, the lens holder 10 can be easily and precisely aligned with the lens 60 at the correct position, thereby obtaining a desired tinting pattern exactly at a desired position.

Figure 6A:
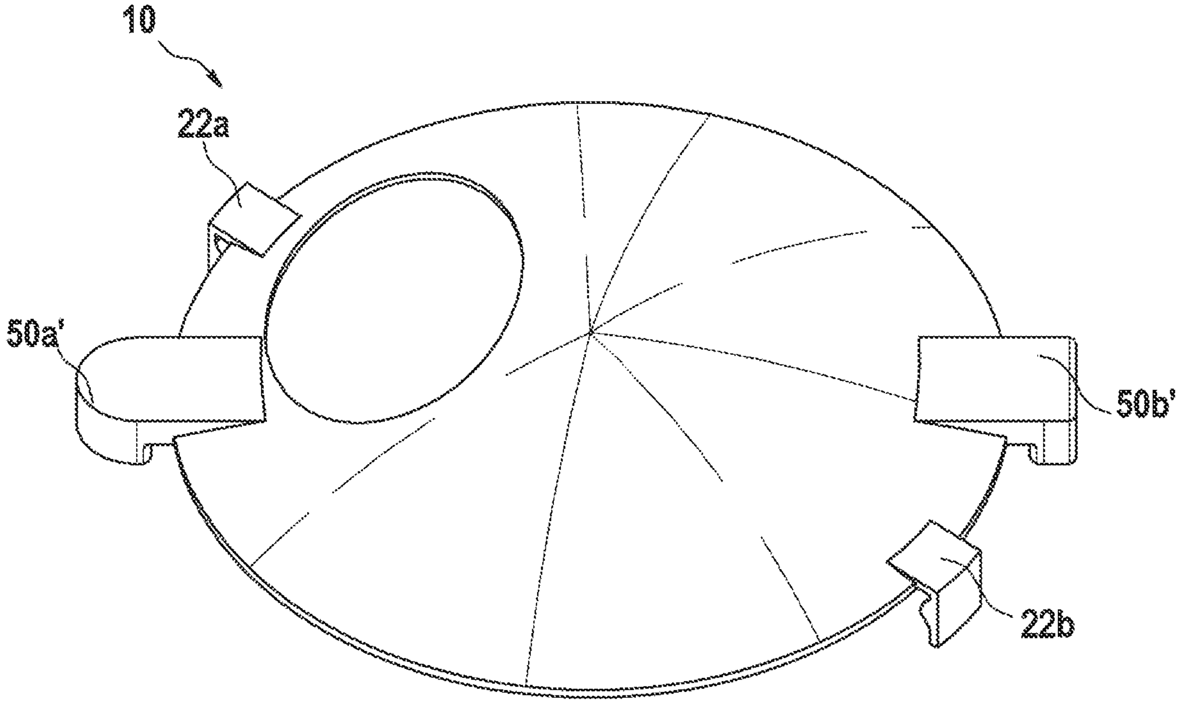
FIGS. 6A and 6B illustrate the fourth exemplary embodiment of the present lens holder wherein the reception unit comprises at least two marking units in a form different from those in FIG. 5A and corresponding lens thereof.
Figure 6B:
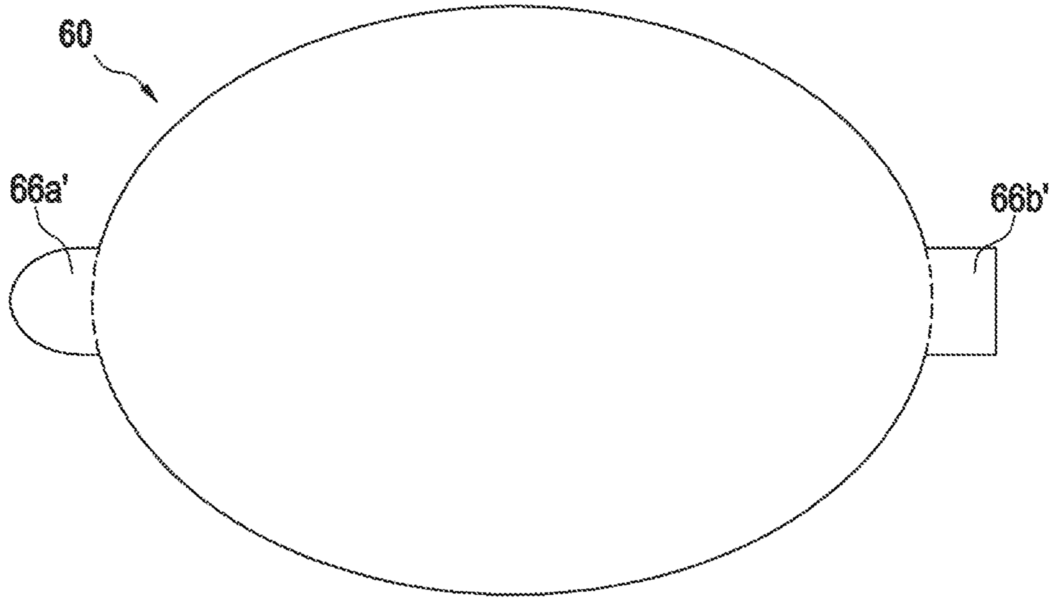

FIGS. 6A and 6B show the fourth exemplary embodiment of a lens holder where the lens holder of the first or second exemplary embodiment further comprises the marking units 50*a*', 50*b*' designed to fit the edge profile of the spectacle lens. For example, if the spectacle lens is manufactured by injection molding, the lens may have a unique shape at the side edge as shown in FIG. 6B for example, a round protrusion 66*a*' (left) and square protrusion 66*b*' (right), which are depicted for an exemplary purpose. In this exemplary embodiment, the marking units 50*a*', 50*b*' can be designed to fit the already-existing edge profile of the lens 66*a*', 66*b*', typically designed using 3D printing. This has the advantage in that no additional markings need to be provided to the lens, but the initial lens design can be used as is to align the marking units 50*a*', 50*b*', accordingly the lens holder 10, at the precise position. In some cases, the marking units 50*a*', 50*b*' may also function as the holding units and in such a case, separate holding units 22*a*, 22*b* may not be necessary.

Figure 7A:
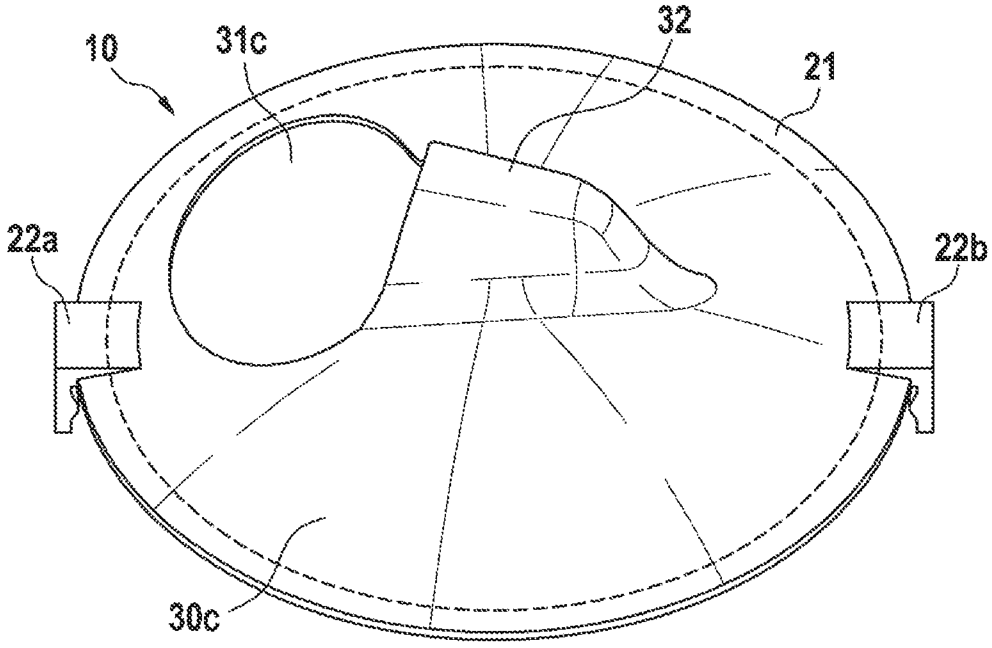
FIGS. 7A and 7B illustrate the fifth exemplary embodiment of the present lens holder for border gradient tint and the lens with the border gradient tint.
Figure 7B:
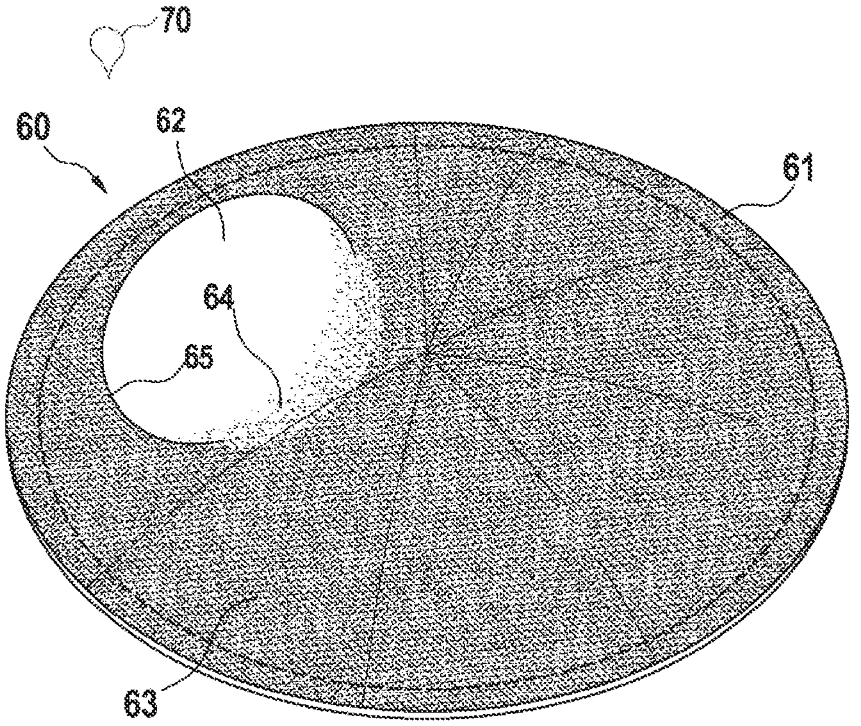

FIGS. 7A and 7B show the fifth exemplary embodiment of a unique lens holder 10 and the lens 60 having the border gradient tint 64 produced using the lens holder 10. In this exemplary embodiment, the masking unit 30*c* may further comprise a spatial protrusion 32 adjacent to an opening 31*c*. Due to the spatial gap between a spatial protrusion 32 of the masking unit 30*c* and the surface of the spectacle lens 60 or the average height of the surface of the masking unit 30*c*, the lens 60 can have the border gradient tint 64 comprising borders with smooth transition 64 of tint intensity from the tinted surface 63 to non-tinted surface 62. Depending on the height of the spatial protrusion 32 from the surface of the spectacle lens 60, the tinting intensity and degree of transition may vary. In contrast, the border of the tinted part and non-tinted part produced using a lens holder 10 comprising a masking unit 30*a*, 30*b* without the spatial protrusion 32 will have a sharp transition (without gradient) of tint intensity from the tinted surface to non-tinted surface.

As shown in FIG. 7B, at a border 65 (on the left side; between tinted surface 63 and non-tinted surface 62) which was completely covered by the masking unit 30, the transition of tint intensity would be sharp (without gradient), while at a border 64 (on the right side; between tinted surface 63 and non-tinted surface 62) where the corresponding part of the lens holder 10 has a spatial gap between the spatial protrusion 32 and the surface of the spectacle lens 60, the transition of tint intensity from the tinted surface 63 to the non-tinted surface 62 would be smooth.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A method for tinting a spectacle lens having a surface, the method comprising the steps of:

(i) selectively plasma treating a preselected part of the surface of the spectacle lens to introduce cross-linking of the preselected part; and (ii) providing a tinting solution at least to a part of the surface of the spectacle lens not treated by the plasma treating, wherein the preselected part of the surface of the spectacle lens and the part of the surface of the spectacle lens not treated by the plasma treating are made from a same material prior to the plasma treating, wherein the preselected part of the surface of the spectacle lens is chemically modified by the plasma treating to modify the surface to inhibit the tinting solution from entering the preselected part, wherein the part of the surface of the spectacle lens not treated by the plasma treating is tinted by the tinting solution, wherein the spectacle lens contains a polymeric lens material, and wherein the preselected part of the surface of the spectacle lens and the part of the surface of the spectacle lens not treated by the plasma treating remain on the spectacle lens.

2. The method according to claim 1, further comprising the steps of:

masking a part of the surface of the spectacle lens other than the preselected part to form a masked part prior to the plasma treating; and de-masking the masked part of the surface of the spectacle lens after the plasma treating and prior to providing the tinting solution to the spectacle lens.

3. The method according to claim 2, wherein the masking of the part other than the preselected part of the surface of the spectacle lens is performed by means of a lens holder in a predefined position which comprises a reception unit configured to hold the spectacle lens and a masking unit to protect the part other than the preselected part of the surface of the spectacle lens during the plasma treating.

4. The method according to claim 1, wherein the spectacle lens comprises a polymeric lens material.

5. The method according to claim 1, wherein the plasma treating is performed by means of a gas discharge.

6. The method according to claim 1, wherein the tinting solution is an aqueous tinting solution.

7. A non-transitory computer-readable data carrier comprising instructions which, when executed by a computer, cause the computer to carry out the steps of the method according to claim 1, wherein the step of plasma treating is performed by an apparatus suitable for plasma treating, and the step of providing a tinting solution is performed by an apparatus suitable for providing a tinting solution.

* * * * *